Sept. 22, 1964  T. A. ORR, JR  3,149,623
PORTABLE COLLAPSIBLE GRILL
Filed Oct. 10, 1962
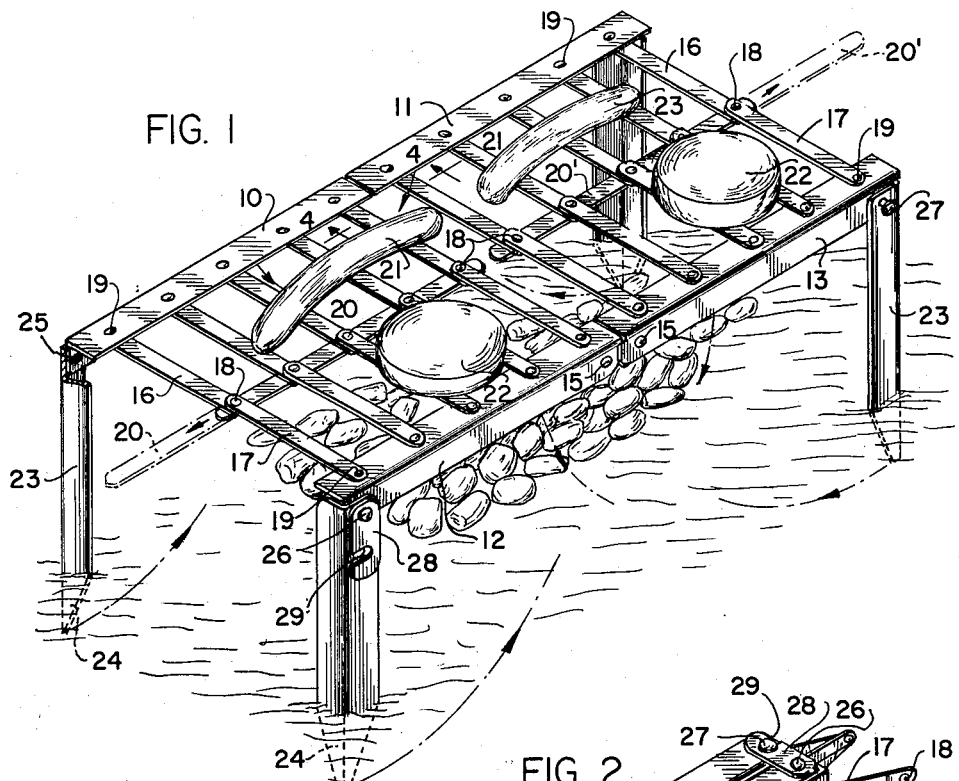
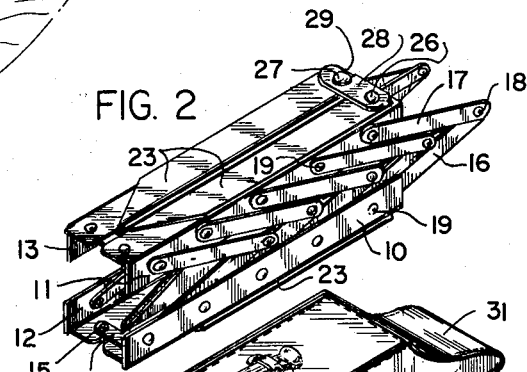
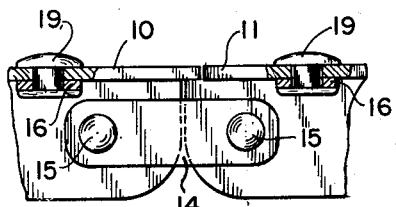
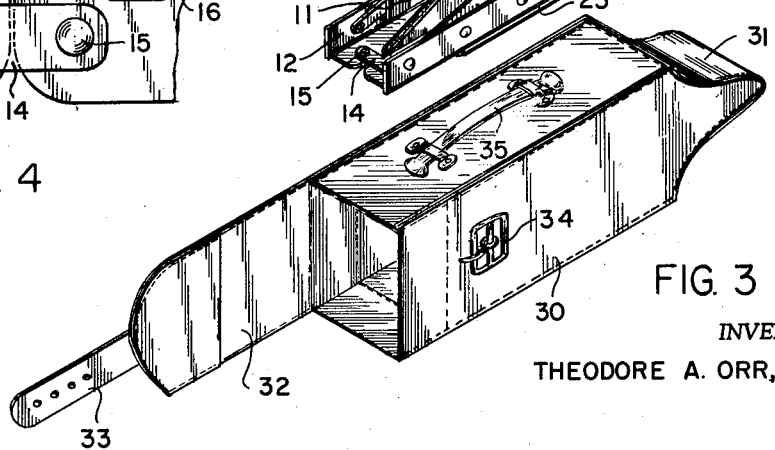
INVENTOR
THEODORE A. ORR, JR.
BY
*A. Yates Dowell I & II*
ATTORNEYS 3,149,623
PORTABLE COLLAPSIBLE GRILL
Theodore A. Orr, Jr., % Acme Machine Co.,
1417 Trinity Ave., High Point, N.C.
Filed Oct. 10, 1962, Ser. No. 229,677
6 Claims. (Cl. 126—9)

This invention relates to articles of various kinds used by mankind for convenience, comfort and pleasure, including in the processing and preparation of food for his sustenance and enjoyment both within and outside of the dwelling in which he lives.

The invention relates particularly to a grill for convenient and easy support for food to be cooked at the proper distance from and above an open fire, as for example by campers, picnickers, Boy Scout groups, hunters, fishermen, or others engaged in outdoor activities requiring open campfires.

Various types of devices have been produced on which to support food and other things to be subjected to heat from an open fire, but prior devices have not been satisfactory but have been subject to objection for one reason or another, including massiveness, the large amount of space required for transportation or storage, the cost, and the fact that smut or sooty portions were exposed in a manner to soil the clothing or other things with which they would come in contact, as well as that they did not provide an adequate grill or support during use.

It is an object of the invention to overcome the weaknesses of and objections to prior devices and to provide a grill or support which can be readily set up from a collapsed condition to a position of use with maximum facility for supporting food and the like to be subjected to an open fire, and which device will occupy a minimum of space and can be carried in compact form in a case or container during non-use and in a manner so that carbon black thereon will not come in contact with and soil clothing or other articles with which it comes in contact.

Another object of the invention is to provide a grill of spaced longitudinal and cross bars and supporting legs with sharpened ends which may be driven into the ground to provide a horizontal grill, which can be folded together in compact form or extended to provide a grill of spaced bars with the spacing sufficiently close to support frankfurters, hamburgers, chicken, steaks, and the like.

Another object of the invention is to provide a grill which can be folded into compact form, and with a case or container for the device and into and from which the collapsed grill may be readily inserted and removed, and when so contained will be prevented from soiling the clothing or other objects, and which device is provided with a latch for securing the parts in compact condition.

Other objects and advantages of the invention will be apparent from the following description considered in conjunction with the accompanying drawing where, FIG. 1 is a perspective of the invention fully expanded and in use;

FIG. 2, a similar view of the invention in fully collapsed condition;

FIG. 3, a perspective of a carrying case for the grill, and

FIG. 4, a section on the line 4—4 of FIG. 1.

Briefly stated the invention comprises two grill frames or sections of similar size pivotally connected to provide a supporting area corresponding to the total of both and with the remote ends of each of the pivotally connected grill sections provided with foldable legs tapered at their outer ends to facilitate their being driven into the ground. The two grill sections are composed each of a pair of side bars L-shaped in cross section, with one side disposed horizontally and the other depending. Between the side bars are a series of spaced cross bars each being of two equal segments spanning half the distance between the side bars and with ends of each pair of segments pivotally connected together and to a center bar so that when the center bar is moved lengthwise from a straight line position the side bars will move toward each other, and when moved lengthwise in the opposite direction the side bars will be moved apart. The center bars of the two grill sections are movable in opposite directions to contract or move the side bars toward each other and they are movable in the opposite direction for reverse action. The grill frames are connected by means of links each having one end pivoted to each of the grill frames at each side of the device and with the side members of the grill frames having short and long overlapping portions to provide satisfactory joints. Legs for the device likewise are formed of angle iron having two equal sides joined at right angles with the upper ends of the leg pivoted to the depending portions of the side frames of the grill so that the legs may swing beneath such side bars into intimate relation therewith and after the frame is collapsed to maintain the usuable surfaces of the grill sections remote from each other a latch is pivoted at one end of the grill on the same pivot as the leg and is designed for engagement with an extension of the pivot for the leg at the opposite end of the grill.

With continued reference to the drawing, the grill of the present invention is of generally rectangular shape with a side of two parts 10 and 11, and a second side of two parts 12 and 13. Each of the two-part sides is of angle iron or L-shaped construction for strength with the two parts of each of the sides joined by a link 14 connected at its ends by pivots 15 to the adjacent ends of the side members or sections 10 and 11 to form a connection therebetween. In like manner another similar link is located between the adjacent ends of the side members or sections 12 and 13 to form a connection therebetween.

In order to make a solid connection between the two sections at each side of the grill the horizontal flanges of the side members 11 and 13 are made shorter than the depending flanges and the horizontal flanges of the members 10 and 12 are made slightly longer than the depending flanges so that a horizontal joint is provided offset from a verticle joint between each section of the pair of side members.

It will be understood that the links 14 are of a length and the spacing of the pivots 15 is such that the joint between each of the two-part side members can be readily moved so that the side members are disposed in a straight line as illustrated in FIG. 1 or in two parallel lines as illustrated in FIG. 2.

Between the horizontal flanges of the side members 10 and 12 are spaced cross bars each composed of two equal sections or half lengths 16 and 17 connected by pivots 18. The opposite ends of the bars 16 and 17 are connected by pivots 19 to the side members 10 and 12 with the remote end of the bars 16 underlying the horizontal flange of the side member 10 and the remote ends of the bars 17 overlying the horizontal flange of the side member 12.

An operating bar 20 is connected to each of the pivots 18 and when such bar is moved endwise is causes the sections 16 and 17 to move from a straight line position to cause the side members 10 and 12 to move close together and when the operating bar 20 is moved in the reverse direction the side members 10 and 12 will be moved apart.

In like manner the side bars 11 and 13 are provided with similar cross bars 16 and 17 connected by the pivots 18 but with a central bar 20' connected to the pivots 18 so that the operating bars 20 and 20' must be moved in opposite direction to contract the two sides of the grill toward each other or to move them apart. Thus the operating bars 20 and 20' will not interfere with each other.

The spacing of the side bars is determined by the length of the cross bars and they may vary to suit requirements. The grill is about twice as long as it is wide and the cross bars are spaced closely enough to provide the desired support for articles to be subjected to heat. Also the grill is fabricated of metal or other substance capable of withstanding high temperatures without warping.

In the use of the device if long, slim objects such as frankfurters 21 are desired to be cooked they may be placed lengthwise on the grill across two or more of the cross members, while if it is desired to cook a hamburger or meat patty 22 it can be placed across two or more of the cross bars. In like manner the grill may be used for other foods by direct heat or to supply heat to a frying pan, coffee pot or the like.

The grill preferably is supported by legs 23 of angle iron or members composed of two sides located at right angles one to the other and preferably with tapered or pointed extremities 24 to facilitate their being driven into the ground enough to support the grill in a horizontal position as well as at the desired elevation.

The legs 23 are secured at the four corners of the grill and to the remote extremities of the side bars 10 and 11 by rivets 25 and to the remote ends of the sections 12 and 13 by rivets 26 and 27. The rivet 26 also forms a support for one end of a latch 28 having a notch 29 for receiving the extended portion of the rivet 27 so that when the parts are collapsed they may be fastened together as illustrated in FIG. 2.

Preferably a case 30 is provided of a configuration to receive in a snug manner the collapsed grill, such case having a pointed end portion 31 and a flat foldable cover 32 with a fastening strap 33 for engagement with a buckle 34. If desired the case may have a carrying handle 35 for facilitating the transportation of the grill and to provide a means for suspending on a hook or the like.

It will be apparent from the foregoing that a relatively simple and inexpensive grill is provided which may be maintained in collapsed condition and covered when not in use, but which may readily and quickly be installed to support food or other matter to be subjected to heat over an open flame including an open fireplace.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A foldable collapsible grill comprising a pair of grill sections pivotally connected in end to end relation each including spaced side members, spaced cross bars connecting opposed side members of each section, each cross bar being composed of multiple segments pivoted together, and an operating bar on each grill section attached to the pivots between said multiple segments in an extended position of use or substantially in side by side relation, the operating bars of the grill being movable in opposite endwise directions for causing the side bars of each section to be moved toward and from each other, and a leg pivoted to each of the side bars at each end of the grill and having penetrating remote extremities for facilitating insertion in the ground for mounting the grill in a horizontal position.

2. A foldable collapsible grill comprising a pair of grill sections pivotally connected in end to end relation each including spaced side members of each section, each cross bar being composed of multiple segments pivoted together and an operating bar attached to the pivots between said multiple segments and operable to dispose said multiple segments in maximum spaced relation with each group of multiple segments approaching parallelism and the side bars closely spaced, the operating bars of the grill being movable in opposite endwise directions for causing the side bars of each grill section to be moved toward and from each other, and legs pivoted to the side bars at each end of the grill for mounting the grill in a horizontal position, said grill being foldable.

3. A foldable collapsible grill comprising a pair of grill sections pivotally connected in a manner that they may be disposed in extended substantial alignment for use and folded together in side by side relation for compactness when not in use, each grill section having spaced side members, a series of spaced cross members, each composed of a pair of pivotally connected links of substantially equal length pivoted together and to said spaced side members whereby they may be disposed in a straight line in one position and in angular relation in a second position, and means for securing the pivots in folded relation.

4. The structure of claim 1 and means for latching the remote ends of the grill in collapsed generally parallel close proximity.

5. The structure of claim 3 having pivotally mounted leg forming corner members foldable flat against the spaced side members.

6. The structure of claim 5 and a protective case for enclosing said grill when in collapsed condition.

References Cited in the file of this patent
UNITED STATES PATENTS

| | | |
|---|---|---|
| 793,151 | Palmer | June 27, 1905 |
| 1,094,151 | Kemp | Apr. 21, 1914 |
| 1,102,649 | Dix | July 7, 1914 |
| 2,594,153 | Greffe | Apr. 22, 1952 |